US009352291B2

(12) United States Patent
Lochhead et al.

(10) Patent No.: US 9,352,291 B2
(45) Date of Patent: May 31, 2016

(54) DISPERSANT FOR SPILLED OIL

(75) Inventors: Robert Y. Lochhead, Hattiesburg, MS (US); Sarah Elizabeth Morgan, Hattiesburg, MS (US); Samy Madbouly, Ames, IA (US); Yan Zong, Hattiesburg, MS (US)

(73) Assignee: The University of Southern Mississippi, Hattiesburg, MS (US)

( * ) Notice: Subject to any disclaimer, the term of this patent is extended or adjusted under 35 U.S.C. 154(b) by 0 days.

(21) Appl. No.: 13/371,018

(22) Filed: Feb. 10, 2012

(65) Prior Publication Data
US 2013/0075337 A1 Mar. 28, 2013

Related U.S. Application Data

(60) Provisional application No. 61/538,538, filed on Sep. 23, 2011.

(51) Int. Cl.
C09K 3/00 (2006.01)
C02F 1/00 (2006.01)
B01F 17/00 (2006.01)
C02F 1/40 (2006.01)
C09K 3/32 (2006.01)
E02B 15/04 (2006.01)
C02F 101/32 (2006.01)
C02F 103/08 (2006.01)
C02F 1/68 (2006.01)

(52) U.S. Cl.
CPC ......... B01F 17/0064 (2013.01); B01F 17/0028 (2013.01); B01F 17/0085 (2013.01); C02F 1/40 (2013.01); C09K 3/32 (2013.01); C02F 1/682 (2013.01); C02F 2101/32 (2013.01); C02F 2103/08 (2013.01); E02B 15/04 (2013.01)

(58) Field of Classification Search
None
See application file for complete search history.

(56) References Cited

U.S. PATENT DOCUMENTS

| 3,900,421 | A | * | 8/1975 | Fusey | 516/56 |
| 5,244,574 | A | * | 9/1993 | Gatt et al. | 210/610 |
| 5,821,113 | A | * | 10/1998 | Haslimann | 435/264 |
| 6,284,267 | B1 | | 9/2001 | Aneja | |
| 6,610,322 | B1 | | 8/2003 | Keller et al. | |
| 6,958,160 | B1 | | 10/2005 | Keller et al. | |
| 7,150,883 | B2 | | 12/2006 | Keller et al. | |
| 7,718,190 | B2 | | 5/2010 | Keller et al. | |
| 7,794,595 | B2 | * | 9/2010 | Keller | 210/600 |
| 8,580,240 | B1 | * | 11/2013 | Dziubla et al. | 424/78.17 |
| 2010/0197810 | A1 | * | 8/2010 | Hedges et al. | 514/773 |
| 2012/0027837 | A1 | * | 2/2012 | DeMuth et al. | 424/443 |

OTHER PUBLICATIONS

Mezdour, S., et al. "Oil/water surface rheological properties of hydroxypropyl cellulose (HPC) alone and mixed with lecithin: Contribution to emulsion stability", Colloids and Surfaces A: Physicochemical and Engineering Aspects, 2008, 331, 76-83, Elsevier.*

(Continued)

Primary Examiner — Nam Nguyen
Assistant Examiner — Clare Perrin
(74) Attorney, Agent, or Firm — Butler Snow, LLP

(57) ABSTRACT

A method for dispersing oil spilled into the aqueous environment comprising the treatment of the spilled oil with an oil dispersant composition comprising a phospholipid and a polysaccharide derivative is disclosed.

17 Claims, 9 Drawing Sheets

(56) References Cited

OTHER PUBLICATIONS

Mezdour et al. "Oil/water surface rheological properties of hydroxypropyl cellulose (HPC) alone and mixed with lecithin: Contribution to emulsion stability", Colloids and Surfaces A: Physiochem. Eng. Aspects, 2008, 331, 76-83, Elsevier.*

Lochhead, et al. "Mitigating the Coastal Ecological Damage of Spilled Oil via Oil Anti-Deposition Strategies", in Mineral Scales in Biological and Industrial Systems, Amjad, Zahid, Taylor and Francis Group, 2010, 325-338.*

Mezdour, et al. "Oil/water surface rheological properties of hydroxypropyl cellulose (HPC) alone and mixed with lecithin: Contribution to emulsion stability", Colloids and Surfaces A: Physicochemical and Engineering Aspects, 2008, 331, 76-81, Elsevier.*

Stockmann, et al. "The Influence of Various Emulsifiers on the Partitioning and Antioxidant Activity of Hydroxybenzoic Acids and Their Derivatives in Oil-in-Water Emulsions", Journal of the American Oil Chemist's Society, 2000, 77, 535-542.*

Duerr, et al. "Physical effects of Prudhoe Bay crude oil water accommodated fractions (WAF) and Corexit 9500 chemically enhanced water accommodated fractions (CEWAF) on common murre feathers and California sea otter hair", SSEP Study: Effects of Chemically and Physically Dispersed Oil on Wildlife, 2009, pp. 1-12.*

Nollert, et al.; Lipid Vesicle Adsorption versus Formation of Planar Bilayers on Solid Surfaces; Biophysical Journal, vol. 69 pp. 1447-1455 Oct. 1995.

Keller, et al.; Surface Specific Kinetics of Lipid Vesicle Adsorption Measured with a Quartz Crystal Microbalance; Biophysical Journal vol. 75 pp. 1397-1402 Sep. 1998.

Johnsson, et al.; Liposomes, Disks, and Spherical Micelles: Aggregate Structure in Mixtures of Gel Phase Phosphatidylcholines and Poly(Ethylene Glycol)-Phospholipids; Biophysical Journal vol. 85 pp. 3839-3847 Dec. 2003.

Koynova, et al.; Nanosized self-emulsifying lipid vesicles of diacylglycerol-PEG lipid conjugates: Biophysical characterization and inclusion of lipophilic dietary supplements; Biochemica et Biophysica Acta 1798 pp. 646-653 2010.

W.C. Russell G.L. Choules D.A. Gauthier Detergents and Waterfowl The Journal of Zoo Animal Medicine, vol. 12, No. 1 (Mar. 1981) pp. 10-13.

Managing Oil Impacts on Birds (fact sheet) National Oceanic and Atmospheric Administration (NOAA) NOAA fact sheet Wildlife and Sensitive Lands Jun. 24, 2010.

Jay Holcomb Jennifer Strickland, videographer Oiled Bird Bath (video) Fort Jackson Wildlife Rehabilitation May 15, 2010; https://www.youtube.com/watch?v=HHYfUOixMsU.

Keith Olberman Countdown with Keith Olberman (video) Gulf Oil Spill Birds—Don't let Kids Watch https://www.youtube.com/watch?v=CwhIXG-fe-A 2010.

* cited by examiner (a)

(b)

(a)

(b)

(a)

(b)

(a)

(b)

(a)

(b)

(a)

(b)

DISPERSANT FOR SPILLED OIL

CROSS-REFERENCES TO RELATED APPLICATIONS

This application claims the benefit of U.S. Provisional Application No. 61/538,538 filed Sep. 23, 2011, which is incorporated herein by reference in its entirety.

STATEMENT REGARDING FEDERALLY SPONSORED RESEARCH OR DEVELOPMENT

This invention was made with government support under NSF Rapid Project 1047662 awarded by the National Science Foundation. The government has certain rights in the invention.

FIELD OF THE INVENTION

The present invention is generally directed toward a method of dispersing oil following an oil spill. More particularly, it is directed toward a composition that disperses oil without damaging wildlife and vegetation.

BACKGROUND OF THE INVENTION

About 250 million gallons of oil are accidentally spilled into the marine environment every year. Worldwide, the annual crude oil spillage to the ocean is estimated to be about 150 million gallons per year from ship maintenance, about 35 million gallons from transportation accidents, about 15 million gallons from offshore drilling and production, and 60 million gallons from seafloor seepage that has taken place naturally for millions of years.

When oil spills threaten shorelines, dispersants are used to break up the oil into smaller droplets. This keeps the oil in deep water and helps to prevent it from washing ashore where there would be much greater environmental impact. However, oil still remains in the environment and washes ashore with devastating effects on wetlands, beaches and the wild-life thereon. These dispersants do not prevent fouling of substrates, such as birds, animals, and plants, by the spilled oil.

In the Deepwater Horizon incident, more than one million gallons of synthetic dispersants were applied to the Gulf oil spill. These surfactants comprise alkylsulfonate derivatives that are clearly not part of the normal marine ecology. As a consequence, the surfaces to be treated are expected to range from untreated oil/water interfaces to oil droplets emulsified with sulfonate surfactants.

SUMMARY OF THE INVENTION

The invention described herein constitutes a composition and a method for dispersing spilled oil while simultaneously mitigating the spread of oil on living and non-living solid substrates. It is a first object of the invention to provide a method for dispersing oil spilled into the aqueous environment comprising the treatment of the spilled oil with an oil dispersant composition comprising a phospholipid and a polysaccharide derivative. The phospholipid may be lecithin, such as from a plant such as soy, or a lecithin derivative. The polysaccharide derivative may be a cellulose ether, such as hydroxypropylcellulose or hydroxypropylmethylcellulose, or cellulose ester. The oil dispersant may be sprayed, spread or pumped into the immediate vicinity of the spilled oil. The method may be used where the dispersed oil resists fouling of aquatic life forms, including aquatic birds.

It is another object of this invention to provide a composition for dispersing oil spilled into the aqueous environment comprising a phospholipid and a polysaccharide derivative. The phospholipid may be lecithin, such as from a plant such as soy, or a lecithin derivative. The polysaccharide derivative may be a cellulose ether, such as hydroxypropylcellulose or hydroxypropylmethylcellulose, or cellulose ester.

DETAILED DESCRIPTION

Figure 1:
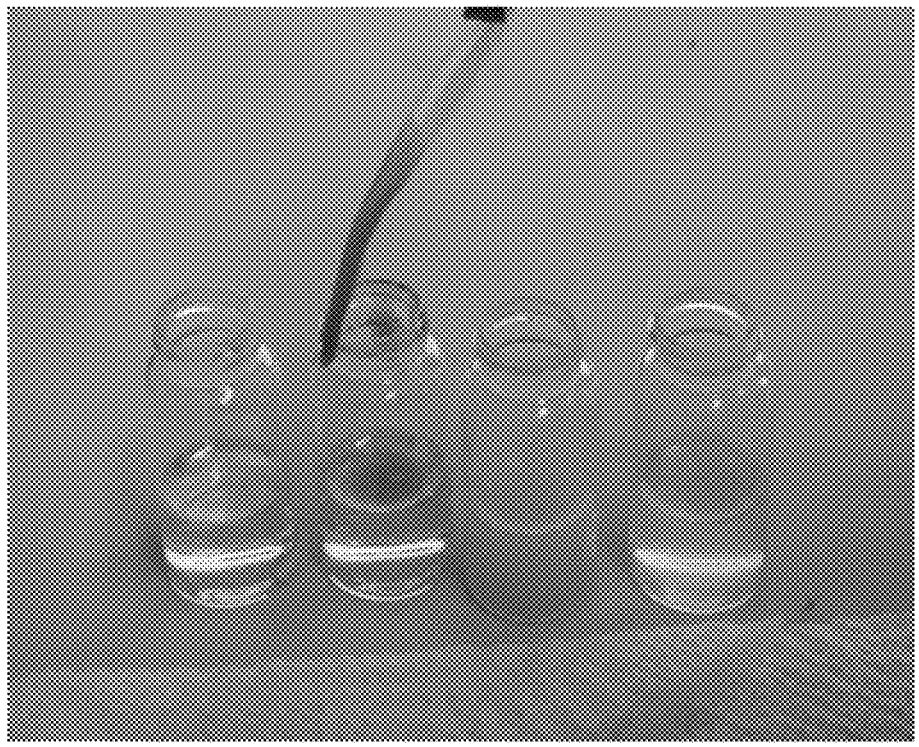
FIG. 1 demonstrates that a duck feather dipped into colored oil on the surface of salt water is readily coated by the oil.
Figure 2:
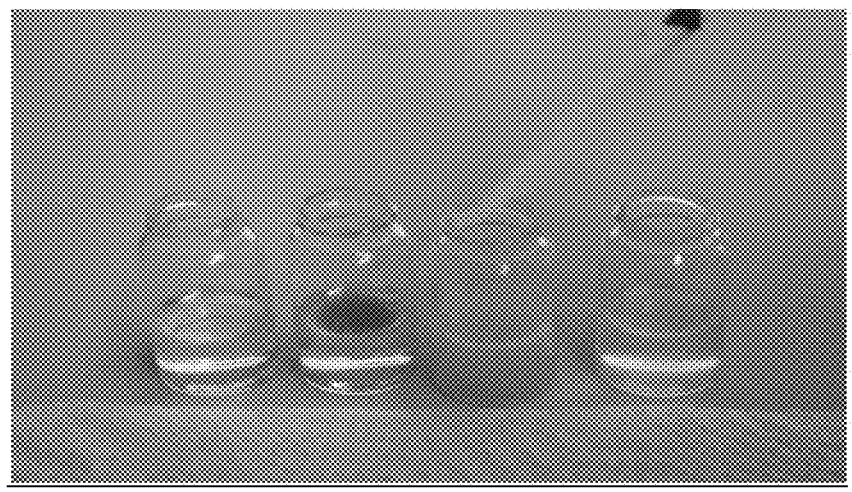
FIG. 2 shows that a duck feather dipped into colored oil dispersed by hydroxypropylcellulose/lecithin is not coated by the oil.

The following detailed description is presented to enable any person skilled in the art to make and use the invention. For purposes of explanation, specific details are set forth to provide a thorough understanding of the present invention. However, it will be apparent to one skilled in the art that these specific details are not required to practice the invention. Descriptions of specific applications are provided only as representative examples. Various modifications to the preferred embodiments will be readily apparent to one skilled in the art, and the general principles defined herein may be applied to other embodiments and applications without departing from the scope of the invention. The present invention is not intended to be limited to the embodiments shown, but is to be accorded the widest possible scope consistent with the principles and features disclosed herein.

When an oil spill occurs, it is essential to reach out to technologies and materials that can be rapidly deployed at the appropriate scale and that can be applied in the environment with minimal impact on the ecology. We disclose such a composition comprising cellulose ethers that can effectively disperse the oil while preventing it from resulting in harm to wildlife and vegetation. We also disclose a method of applying the composition.

For an oil/water/solid interface system in the presence of limited amounts of dispersant, there is essentially a three-way equilibrium: (1) oil dispersed in water by surfactants, (2) oil suspended in water and (3) oil deposited on solid surfaces. The role of the anti-deposition polymer is to keep the oil suspended when the dispersant level is insufficient for the task. It is generally accepted that the oil droplets are mutually attracted by London Dispersion Forces, and coalescence is prevented by steric stabilization or electrosteric stabilization that is conferred by the adsorbed polymer Fabric washing with soil suspension by cellulose ethers was claimed by Lever Brothers' researchers in U.S. Pat. No. 2,994,665 patent filed in 1959. As disclosed by GB Patent 1,314,897, hydroxypropylmethylcellulose prevented oily soil redeposition on hydrophobic substrates such as nylon and poly(ethylene terephthalate), and sodium carboxymethylcellulose prevented oily soil deposition on hydrophilic substrates such as cotton. However, these patents were directed to laundry applications which are typically conducted in fresh water.

On the other hand, the compositions of the present invention are directed to seawater environments. Our experiments have demonstrated that sodium carboxymethylcellulose is precipitated by seawater and it would, therefore, have no applicability in our proposed inventive application. The level of cellulose ether anti-redeposition agents used is in the range of parts per billion to parts per million, and the important factors in determining their efficacy are the nature of the substituents, their degree of substitution, and their overall molecular weights and molecular weight distribution. For example, preferred hydroxybutylmethylcellulose soil anti-redeposition agents have degrees of substitution in the range 1.5-2.3 and molar substitution in the range 0.01 to 0.6 and they are relatively low in molecular weight; the viscosities of 2% solutions are only in the range 10-400 mPa·s, as disclosed in U.S. Pat. No. 4,138,352. However, these guidelines refer only to freshwater laundry applications. There is no teaching in this patent on the use of such compounds to disperse spilled crude oil in the marine environment.

Moreover, the overall efficacy is improved by using carefully-crafted mixtures of cellulose ethers (See Reich et al.). Dominguez et.al teach that the effectiveness of cellulose ethers is significantly affected by the composition of co-existing surfactant and dispersants.

The evaluation of anti-redeposition agents are most commonly fabric swatch launderometer tests conducted according to the protocols laid out by the American Association of Textile Chemists and Colorists such as the 1993 AATCC standard reference detergent and laundry detergents in general, AATC Technical Manual/2010.

These tests are appropriate for the routine testing of laundry compositions, but they are tedious and they offer little insight into the fundamental mechanisms of operation of any particular soil anti-redeposition agent. They provide virtually no insight into the design of dispersants for spilled oil in the marine environment.

Although anti-deposition agents, which prevent oil from being deposited onto a solid substrate are well-known for use in fresh water, little research previously existed showing their efficacy in salt water. An anti-deposition agent that could work in sea water could prevent oil from sticking to sand, soil, plants and the keratin covering of birds and sea animals. For the Deepwater Horizon oil spill, it was appropriate to look to anti-deposition agents to mitigate the soiling of the coastline and the plant and animal life that it supports.

The most commonly used soil anti-deposition agents are cellulose ethers, such as sodium carboxymethylcellulose, hydroxyethylcellulose, hydroxypropylmethylcellulose, hydrophobically-modified hydroxyethylcellulose, certain proteins, vinylpyrrolidone (co)polymers, and acrylate or maleate copolymers. The soil anti-deposition properties of these polymers are well-known in fresh water, but efficacy in sea water was unknown. These cellulose ethers are exempted under the Toxic Substance Control Act (40 CFR 710(B)). They are not likely to accumulate in the food chain due to their water solubility and high molecular weight (i.e., their bioconcentration potential is low). They are nontoxic to fish and aquatic organisms on an acute basis. They are expected to slowly biodegrade in the aquatic environment. Furthermore, they are also available in large quantities and are relatively inexpensive. These compounds are already released into the environment in vast quantities as a consequence of their widespread use in laundry detergents with an insignificant impact on the ecosystem.

In our initial laboratory investigation, we discovered that the best commercial candidates for freshwater, sodium carboxymethylcelluloses, were precipitated by the calcium in sea water and thereby rendered virtually useless. We also discovered that our second best selected candidates, nonionic cellulose ethers, did not adsorb spontaneously to the oil/water interface in the dilute conditions that would be expected from deployment in the sea.

We disclose a composition that allows polysaccharides, such as nonionic cellulose ethers, to be more effective anti-deposition agents in sea water. By incorporating the nonionic cellulose ethers in hydrophobic compounds, preferably in combination with amphipathic compounds, we are able to enhance adsorption at the oil/water interface.

It has been shown that microbial degradation is hindered by lack of phosphorus and nitrogen in shallow waters, such as those found in the Gulf of Mexico. We have discovered that phospholipids, such as soy lecithin, which is biodegradable in the marine environment and which contains both phosphorus and nitrogen in its head group, chaperones nonionic celluloses to the oil/water interface and this system, and this approach could be viable to disperse spilled oil and also to prevent it from fouling coastal substrates.

Furthermore, using high throughput formulation techniques, we have screened a large number of compositions comprising oil, lecithins and cellulose ethers and have identified that the combination of phospholipid and polysaccharide derivatives that creates an ideal oil dispersant composition—one that may be added directly to the site of the oil spill to cause the oil to disperse and then prevent the oil from being deposited again on a solid surface.

In one embodiment of the invention, the phospholipid is a lecithin or lecithin derivative. The lecithin can be of plant origin, for example, soy lecithin.

The polysaccharide of the claimed composition can be a cellulose ether, such as hydroxypropylcellulose or hydroxypropylmethylcellulose. Cellulose ethers have the propensity to sterically-stabilize oil droplets and mitigate spreading and coating of oil on solid substrates, such as birds, animals and coastal vegetation. Cellulose ethers are listed on the EPA subinventory and are not likely to accumulate in the food chain due to their water solubility and high molecular weight (i.e. their bioconcentration potential is low). Furthermore, they are nontoxic to fish and aquatic organisms on an acute basis and are expected to slowly biodegrade in the aquatic environment.

The most promising lecithins and hydroxypropyl celluloses have been evaluated for interfacial tension, rheology, and dispersion in water, and phase diagrams have been generated for these species. We have shown that these dispersants do prevent the oil from wetting hydrophobic fibers (such as feathers). The droplets loosely flocculate, but they do not spread on hydrophobic fibers. In our tests, oil droplets stabilized by lecithin and hydroxypropylcellulose which have been applied to the surface of an untreated hydrophobic polyester fabric. The flocculated droplets were clearly visible in the interstices between the fibers. The addition of just one or two drops of seawater clearly dislodges the droplets and sweeps them away. On the other hand, we applied an emulsion stabilized by di-2-ethylhexylsulfosuccinate and ethoxylated sorbitan mono-oleate (typical of the surfactants used in the current COREXIT brand dispersant that was applied in the Gulf of Mexico). Upon exposure to the hydrophobic polyester mesh, this emulsion, based upon currently-used dispersants, immediately breaks and the oil spontaneously and immediately coats the fibers. We have shown that our results on hydrophobic polyester mesh accurately model the deposition or the lack thereof of dispersed oil on untreated waterfowl feathers. See FIGS. 1 through 4. Thus, we have developed a biodegradable, bio-derived dispersant system that mitigates deposition of oil on coastal substrates.

Working Examples

Samples were prepared by suspending the solutes in simulated sea water with the following compositions: (i) 0.002% (wt.) lecithin in seawater, (ii) 0.002% (wt.) Hydroxypropylcellulose in seawater; (iii) 0.002% (wt.) oil and 0.002% (wt.) lecithin in seawater, (iv) 0.002% (wt.) oil and 0.002% (wt.) Hydroxypropylcellulose in seawater and (v) 0.002% (wt.) oil, 0.001% (wt.) lecithin and 0.001% (wt.) bb in sea water. They were first evaluated using a quartz crystal microbalance, and then by atomic force microscopy.

Quartz Crystal Microbalance with Dissipation Monitoring to Detect Adsorption of Dispersants at the Salt Water/Solid Interface A QUARTZ CRYSTAL MICROBALANCE-D E4 system (Q-SENSE) was used at 24±0.1° C. First, a baseline was obtained by flowing saltwater solution through the cell. The baseline was set as the zero point on frequency and dissipation graphs. Once a stable baseline was observed, the samples were injected into the measurement chamber and changes in frequency and dissipation were recorded as a function of time. Four separate resonant frequencies (overtones, n) were used to drive oscillation of the shear wave through the crystal: 5 MHz (fundamental overtone, n=1), 15 MHz (n=3), 25 MHz (n=5), and 35 MHz (n=7). Since the noise at 5 MHz was very large, we neglected the data on fundamental overtone (n=1). (see Irwin et al). The details of QUARTZ CRYSTAL MICROBALANCE-D technique are have previously been described (see Sauerbrey, G.).

Atomic Force Microscopy analysis was performed on the samples after quartz crystal microbalance analysis. Quartz crystal microbalance sensors were quickly dipped in 18.2 MΩ cm ultrapure water to remove the remnants of salt from the seawater, and dried for ATOMIC FORCE MICROSCOPY imaging. The morphology of the samples was investigated using a Dimension 3000 scanning probe microscope in tapping mode. A silicon probe (Veeco, Camarillo, Calif.) with a nominal force constant of 40 N/m and resonance frequency of 334-390 kHz was used to image samples. ATOMIC FORCE MICROSCOPY imaging was conducted under ambient conditions in a temperature (20° C.) and humidity (40-45%) controlled room. Images and statistical quantities were processed with Gwyddion v.2.24 SPM analysis software.

Control Experiment: Lecithin

Figure 5:
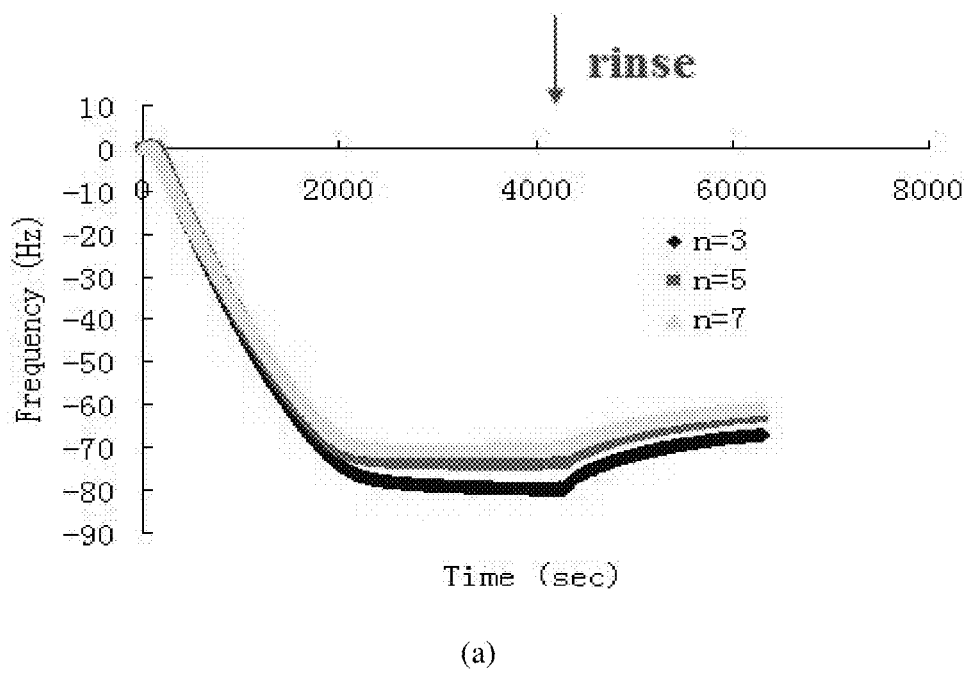
FIG. 5. show quartz crystal microbalance traces of lecithin in seawater. The frequency decreases (a) and the dissipation increases (b) as a function of time (in seconds) for three overtones (n=3, 5, and 7; $f_0$=5 MHz) at 24±0.1° C.
Figure 5:
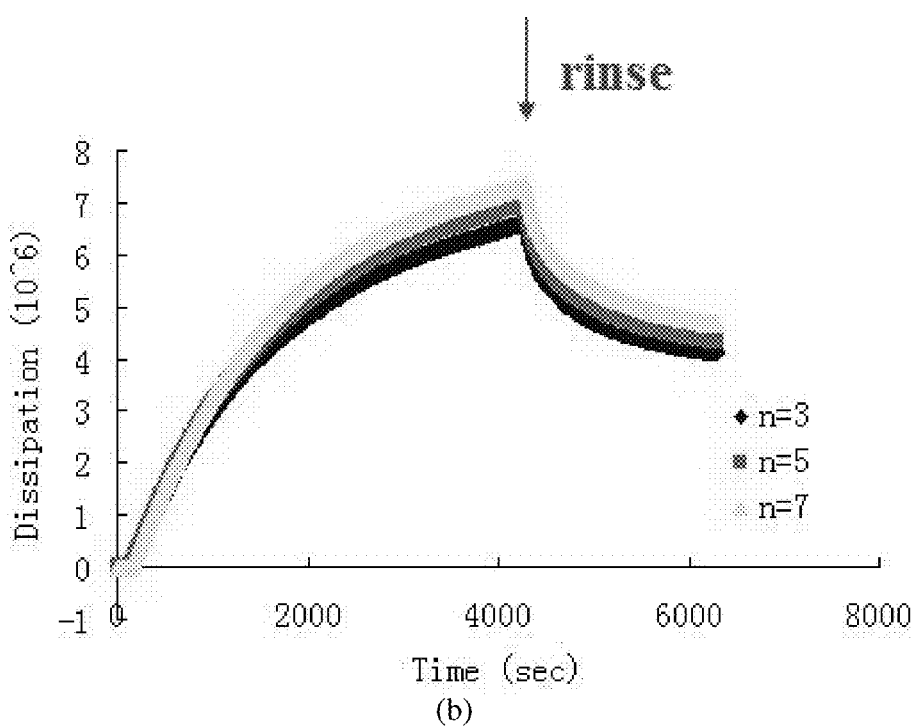

Quartz crystal microbalance traces for frequency (FIG. 5a) and dissipation (FIG. 5b) for the lecithin/seawater suspension are shown in FIG. 5. The gradual decrease in frequency and increase in dissipation observed in this system indicate a relatively slow adsorption of lecithin on the silicon dioxide coated sensors. A steady state was achieved after approximately 2000 seconds. The separation of overtones and change in dissipation ratio are evidence for the formation of at viscous layer. The arrow at 4000 seconds indicates injection of saline solution to rinse the surface. After rinsing for 2000 seconds, the adsorbed lecithin layer was not removed, as indicated by the fact that the frequency and dissipation ratio signals did not return to zero. The thickness of the adsorbed layer is estimated to be 12.6 nm at the completed adsorption and 9.5 nm after rinse.

Hydroxypropylcellulose

Figure 6:
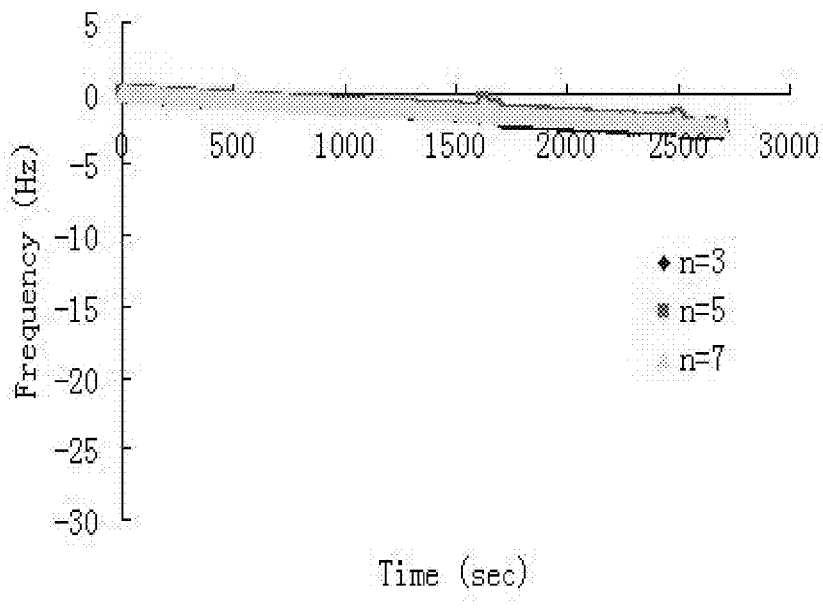
FIG. 6 shows quartz crystal microbalance traces of b in seawater. Very little change is observed in frequency (a) or dissipation (b) as a function of time for three overtones (n=3, 5, and 7; $f_0$=5 MHz) at 24±0.1° C.
Figure 6:
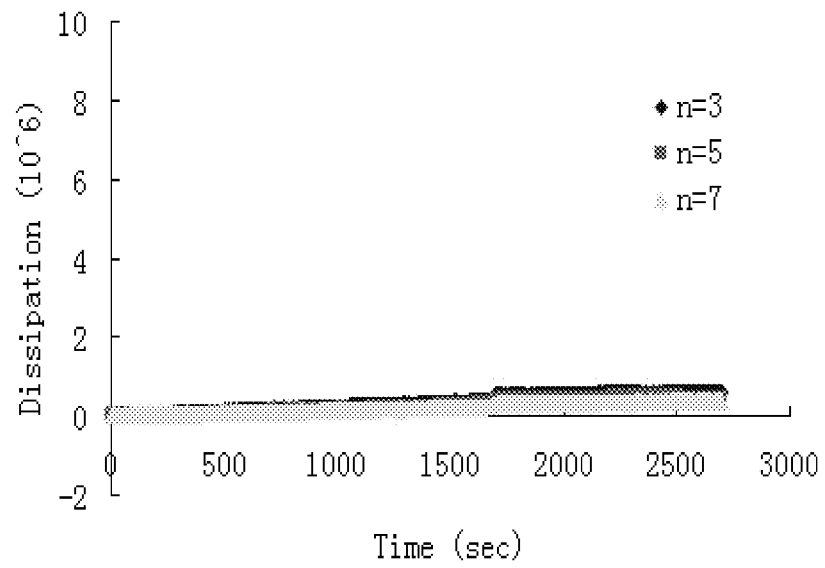

Quartz crystal microbalance traces for hydroxypropylcellulose in seawater are shown in FIG. 6. Only minor change in the frequency and dissipation curves are observed, which are attributed to drift in the instrument over time. No adsorption of the hydroxypropylcellulose on the silicon dioxide surface was observed.

Oil and Lecithin

Figure 7:
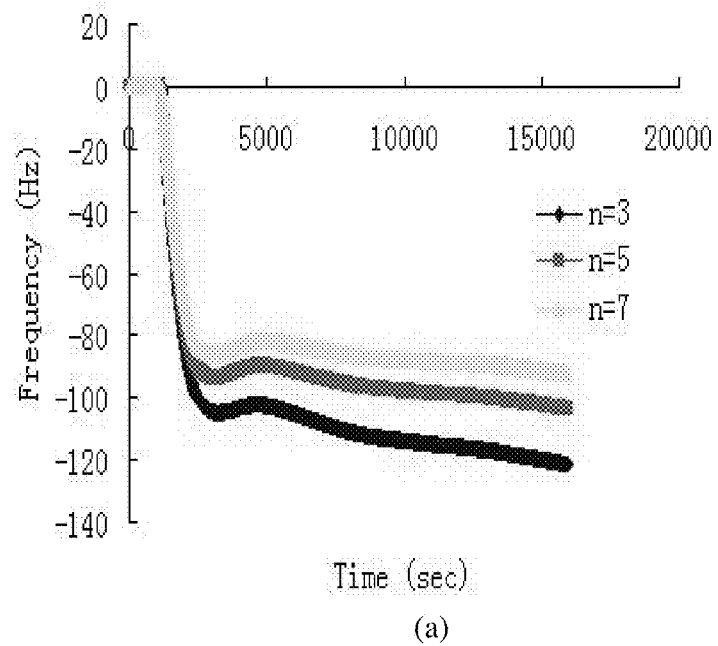
FIG. 7. shows quartz crystal microbalance traces of oil and lecithin in seawater; the frequency decreases (a) and the dissipation increases (b) as a function of time for three overtones (n=3, 5, and 7; $f_0$=5 MHz) at 24±0.1° C.
Figure 7:
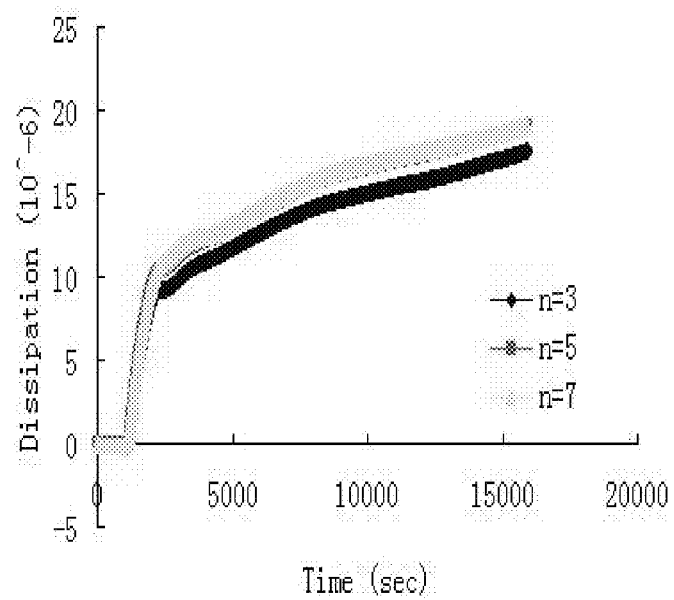

FIG. 7 shows the quartz crystal microbalance traces for oil and lecithin in seawater. The frequency decreased and the dissipation increased at a fast rate upon sample injection, which indicated a fast adsorption process at the initial period. When the $SiO_2$ surface was fully covered, the adsorption rate was reduced, and following that more droplets were absorbed on the pre-adsorbed layer. The gradual adsorption was not complete until 2.5 h after the sample was injected. The separation of overtones and large change in dissipation ratio are evidence of the formation of a viscoelastic adsorbed layer. The thickness of the adsorbed layer is estimated to be 28 nm at the highest adsorption value (adsorption was not complete at this point) and 23.5 nm after rinse.

Figure 3:
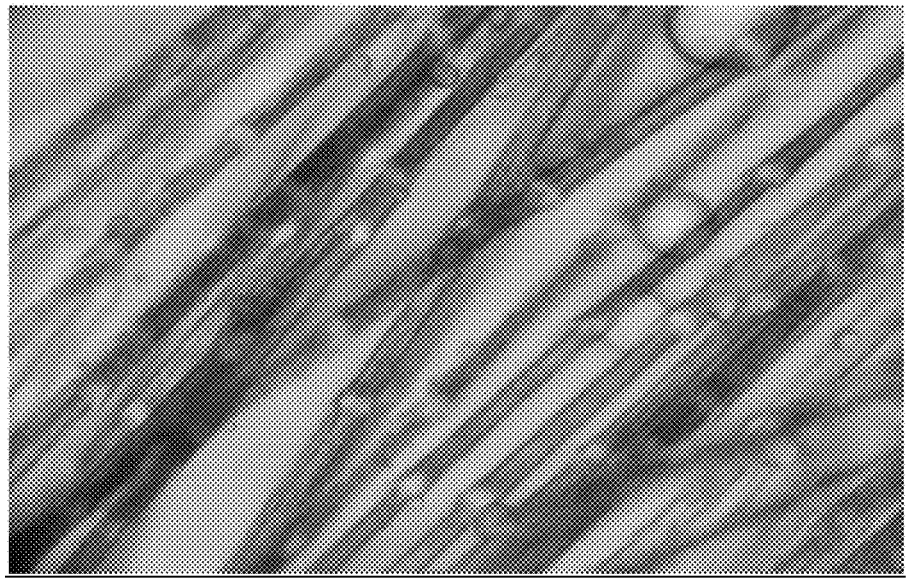
FIG. 3 displays a closer viewing demonstrating that oil dispersed with HPC/lecithin is stabilized against deposition on duck feather fibers.
Figure 4:
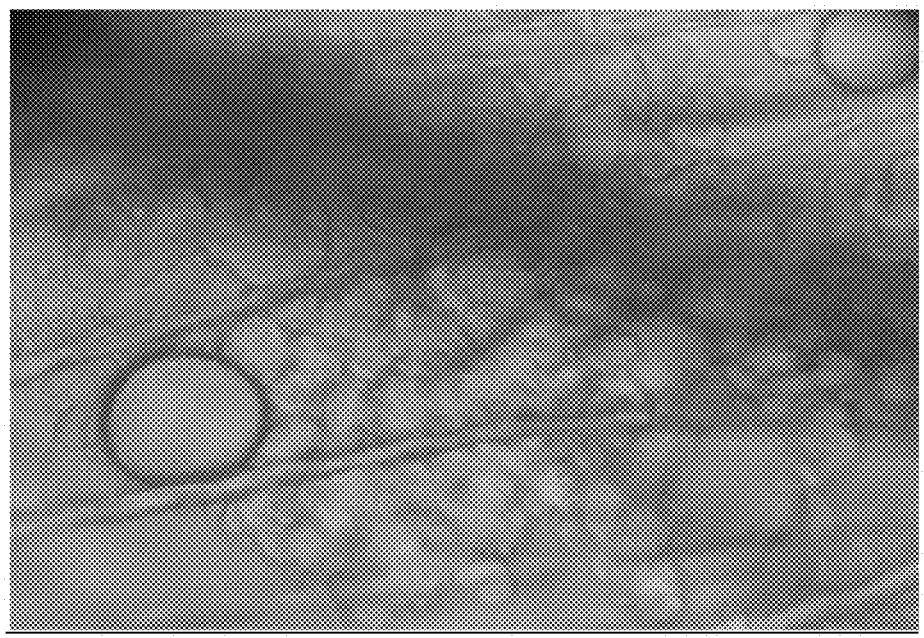
FIG. 4 demonstrates that oil dispersed with Dioctylsulfosuccinate and alkylsorbitan ethoxylate is deposited on feathers.
Figure 8:
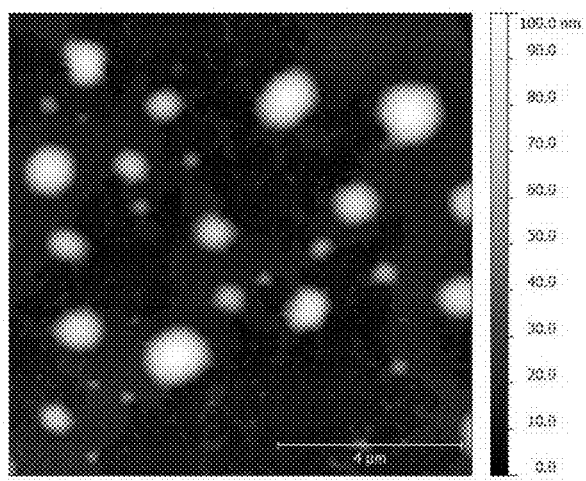
FIG. 8. shows atomic force microscopy images of oil and lecithin on the silicon dioxide quartz crystal microbalance sensor in height mode (a) and phase (b) mode.
Figure 8:
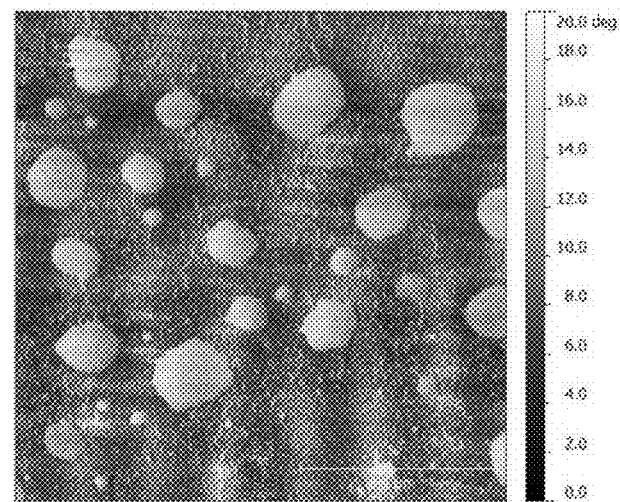

FIG. 8 shows atomic force microscopy height (a) and phase (b) images of the quartz crystal microbalance sensor for which quartz crystal microbalance data is shown in FIG. 3. After quartz crystal microbalance analysis, the sensor was briefly dipped in DI water to remove residual sea salt and dried before atomic force microscopy imaging. Disc-like particles, ranging in diameter from 250-1540 nm are observed, which are attributed to emulsified oil droplets adsorbed to the surface. The atomic force (a microscopy images combined with the quartz crystal microbalance analysis indicate that lecithin disperses the floating oil in seawater, but does not prevent deposition on the silicon dioxide surface.

Oil and Hydroxypropylcellulose

Figure 9:
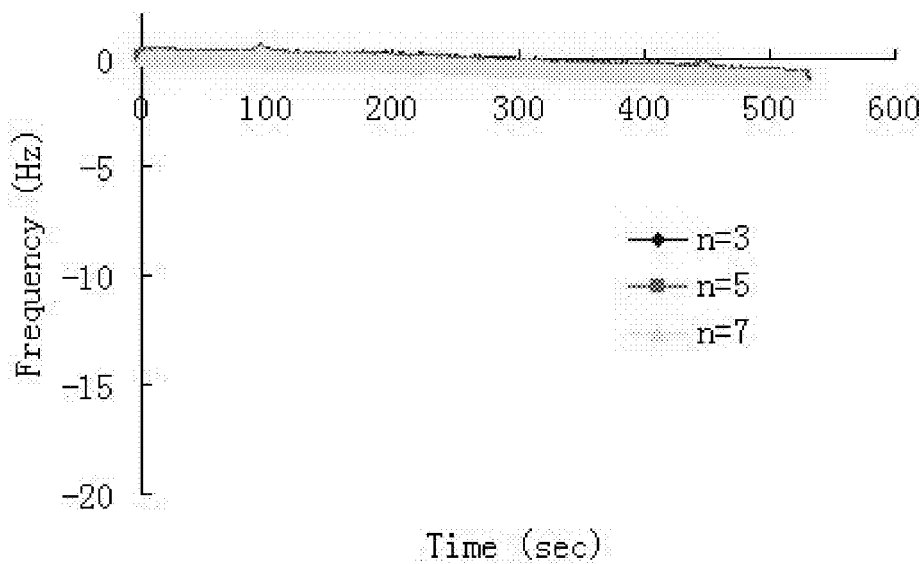
FIG. 9 shows quartz crystal microbalance traces of oil and hydroxypropylcellulose in seawater. There is no obvious change in frequency (a) or dissipation (b) as a function of time for three overtones (n=3, 5, and 7; $f_0$=5 MHz) at 24±0.1° C.
Figure 9:
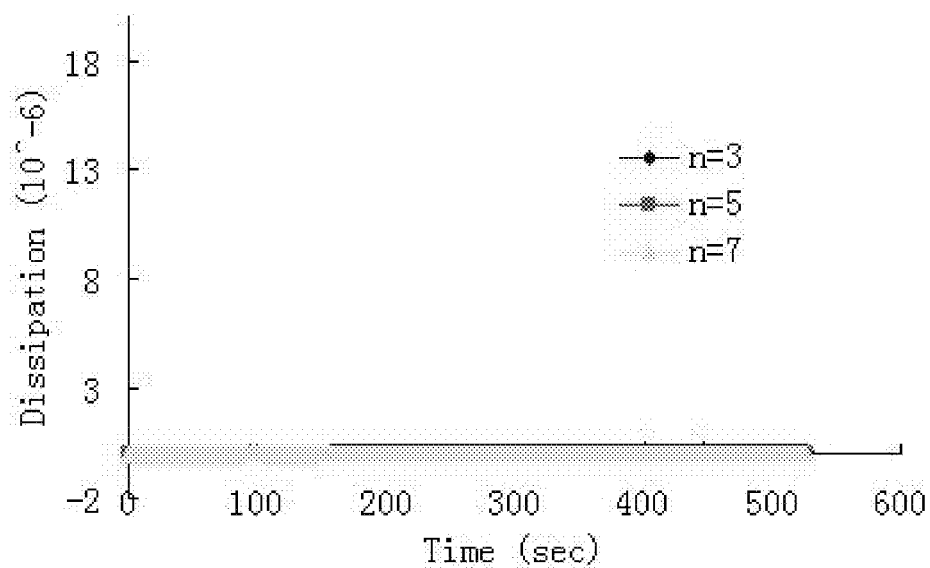

FIG. 9 shows quartz crystal microbalance curves for hydroxypropylcellulose and oil in seawater. No change in frequency or dissipation is observed. Atomic force microscopy analysis of quartz crystal microbalance sensors showed no evidence of adsorption. In the hydroxypropylcellulose/oil/seawater samples it was evident that oil was floating on the surface of the seawater, while in the lecithin/oil/seawater samples the oil appeared dispersed. These findings indicate that hydroxypropylcellulose by itself does not disperse the oil droplets in sea water.

Oil, Lecithin and HPC

Figure 10:
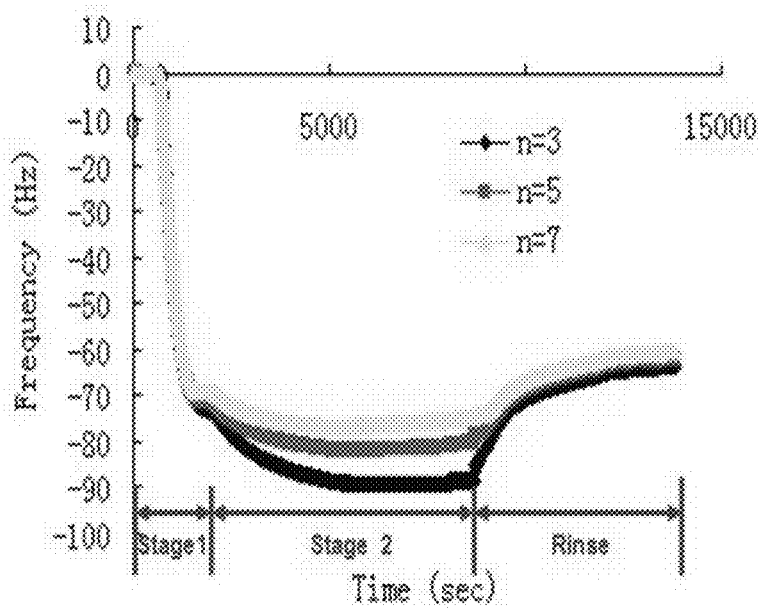
FIG. 10 shows the adsorption of oil lecithin and hydroxypropylcellulose. The frequency decreases (a) and the dissipation increases (b) as a function of time for three overtones (n=3, 5, and 7; $f_0$=5 MHz) at 24±0.1° C.
Figure 10:
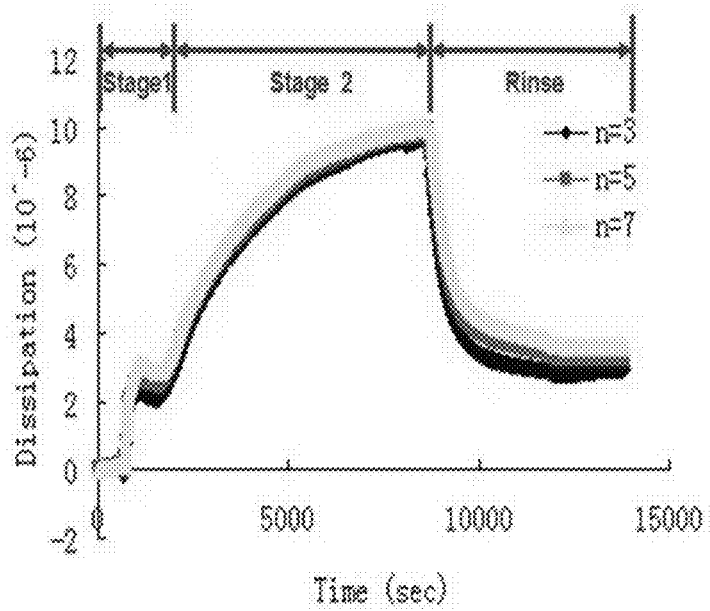
Figure 11:
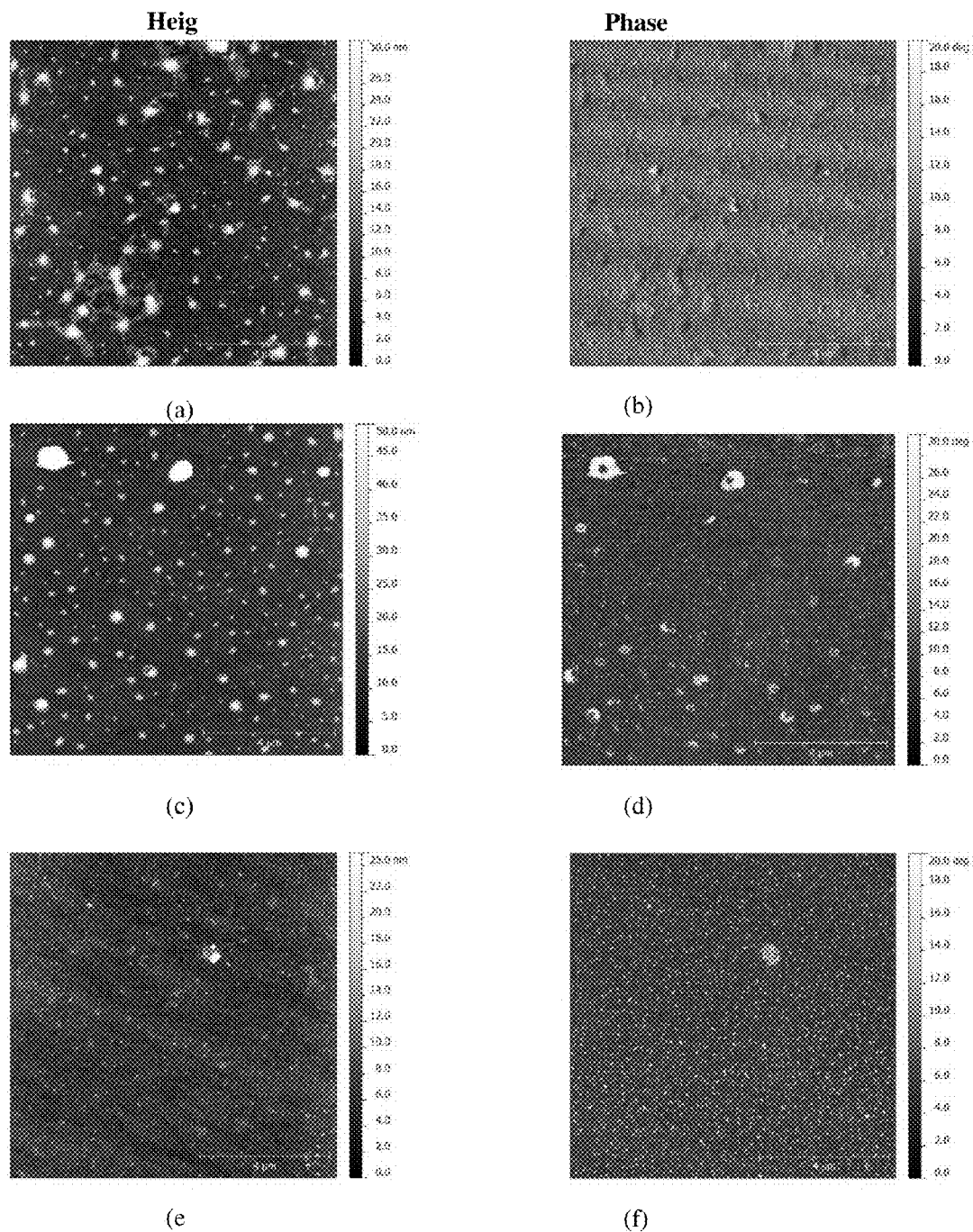
FIG. 11. shows atomic force microscopy height and phase images of oil lecithin and hydroxypropylcellulose spread on the silicon dioxide quartz crystal microbalance sensors at stage 1 (a and b), stage 2 (c and d) and after rinse by seawater (e and f)

FIG. 10 shows quartz crystal microbalance traces for oil, lecithin and hydroxypropylcellulose dispersions in seawater. For these samples, two adsorption stages were observed. Upon the injection of the sample, frequency decreased and dissipation increased sharply, and a short-lived plateau was observed (stage 1). In stage 2 the frequency decreases at a slow rate and dissipation increases at a slow rate. The rapid change in frequency and dissipation is a sign of fast adsorption, which is attributed to the interaction of substrate and oil droplets as discussed earlier. In stage 2 the adsorption curve is similar to that of lecithin (FIG. 1.), a reasonable explanation is the adsorption of oil droplets was saturated, but the adsorption of lecithin was not complete. Moreover, if comparing the changes of frequency and dissipation ratio on the third overtone, we can find the values were much higher for the mixture than pure lecithin. The difference is due to the contribution of the adsorbed oil droplets. In the third stage, after the surface was rinsed by seawater, the great increase in frequency and decrease in dissipation ratio indicated a large amount of mass was lost in this process. The final values of frequency and dissipation ratio are similar to that of pure lecithin sample after rinse, thus we may assume most of the adsorbed oil droplets were removed by the rinse. The thickness of the adsorbed layer is estimated to be 15.5 nm at the completed adsorption and 8.0 nm after rinse For the sample of oil lecithin and hydroxypropylcellulose, three parallel QCM-D measurements were operated to ensure the synchronization and accuracy. The morphology of sensors at stage 1, 2 and after rinse was imaged by atomic force microscopy, respectively. FIGS. 11 (a) and (b) are height and phase images at stage 1. In this stage, dispersed oil droplets were adsorbed onto the substrate quickly. Compared with the oil droplets emulsified only by lecithin (FIG. 8.), the mixture of lecithin and hydroxypropylcellulose reduced the size of oil droplets dramatically. FIGS. 11 (c) and (d) are images at stage 2, of which the hollow structure of oil droplets indicated the oil was partially removed. FIGS. 11 (e) and (f) are height and phase images corresponding to the sensor after rinse. Most of the adsorbed droplets were removed, which is consistent with the QCM-D result. Both the atomic force microscopy and QCM-D results indicated that a hydroxypropylcellulose/lecithin mixture prevented the droplets from being deposited.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

The terms "comprising," "including," and "having," as used in the claims and specification herein, shall be considered as indicating an open group that may include other elements not specified. The terms "a," "an," and the singular forms of words shall be taken to include the plural form of the same words, such that the terms mean that one or more of something is provided. The term "one" or "single" may be used to indicate that one and only one of something is intended. Similarly, other specific integer values, such as "two," may be used when a specific number of things is intended. The terms "preferably," "preferred," "prefer," "optionally," "may," and similar terms are used to indicate that an item, condition or step being referred to is an optional (not required) feature of the invention.

The invention has been described with reference to various specific and preferred embodiments and techniques. However, it should be understood that many variations and modifications may be made while remaining within the spirit and scope of the invention. It will be apparent to one of ordinary skill in the art that methods, devices, device elements, materials, procedures and techniques other than those specifically described herein can be applied to the practice of the invention as broadly disclosed herein without resort to undue experimentation. All art-known functional equivalents of methods, devices, device elements, materials, procedures and techniques described herein are intended to be encompassed by this invention. Whenever a range is disclosed, all subranges and individual values are intended to be encompassed. This invention is not to be limited by the embodiments disclosed, including any shown in the drawings or exemplified in the specification, which are given by way of example and not of limitation.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

REFERENCES

Tadros, Th. F.; Warszynski, P.; Zembala, M.; The influence of polymer adsorption on deposition kinetics of colloid particles II. Experimental studies, Colloid & Surfaces, 1989, 39, 93-105.

Tadros, Th. F.; Warszynski, P.; Zembala, M.; The influence of polymer adsorption on deposition kinetics of colloid particles II. Experimental studies, Colloid & Surfaces, 1989, 39, 93-105.

Reich, I.; Dallenbach, H. R.; Heavy duty liquid detergent Compositions containing a pair of cellulosic soil suspending agents; U.S. Pat. No. 2,994,665, Aug. 1, 1961; Assigned to Lever Brothers Corporation.

Celanese Corporation, Laundry Aids, GB Patent 1,314,897, 26 Apr. 1973. Jost, F.; Andree, H., Schwuger, M.; Wirkungsweise polymerer vergauungsinhibitoren in waschemitteln, Colloid & Polymer Science, (1986), 264, 56-64.

Nicol, C. H.; Burns, M. E.; Alkyl sulfate detergent compositions, U.S. Pat. No. 4,000,093, Dec. 28, 1976, assigned to The Procter & Gamble Company.]

Teot, A. S.; Hamlin, P. J.; Savage A. B.; Detergent compositions with antisoil and antiredeposition properties, U.S. Pat. No. 4,138,352, Feb. 6, 1979, Re. Ser. No. 30,472, Jan. 6, 1981, assigned to the Dow Chemical Company.

Reich, I.; Dallenbach, H. R.; Heavy duty liquid detergent Compositions containing a pair of cellulosic soil suspending agents; U.S. Pat. No. 2,994,665, Aug. 1, 1961; Assigned to Lever Brothers Corporation; Jost, F.; Andree, H., Schwuger, M.; Wirkungsweise polymerer vergauungsinhibitoren in waschemitteln, Colloid & Polymer Science, (1986), 264, 56-64

Dominguez, J. G.; Solans, C.; Detergent efficiency of water/ nonionic surfactant/hydrocarbon systems. Part II: influence of electrolytes, J. Dispersion Science and Technology, (1985), 6, 271-285.; Nicol, C. H.; Burns, M. E.; Alkyl sulfate detergent compositions, U.S. Pat. No. 4,000,093, Dec. 28, 1976, assigned to The Procter & Gamble Company.

Irwin, E. F.; Ho, J. E.; Kane, S. R.; Healy, K. E., Analysis of Interpenetrating Polymer Networks via Quartz Crystal Microbalance with Dissipation Monitoring. Langmuir 2005, 21 (12), 5529-5536.)

Sauerbrey, G., 'Verwendung von Schwingquarzen zur Wägung dünner Schichten and zur Mikrowägung.' Zeitschrift für Physik A Hadrons and Nuclei 1959, 155 (2), 206-222.

We claim:

1. A method for preventing a deposition onto a solid hydrophobic substrate by oil spilled in seawater without wetting the solid hydrophobic substrate comprising applying to the spilled oil a composition comprising one or more lecithins and one or more cellulose ethers selected from the group consisting of hydroxypropylcellulose, hydroxypropylmethylcellulose, and combinations thereof.

2. The method of claim 1 wherein said applying to the spilled oil is performed by an application selected from the group consisting of spraying, spreading, and pumping said composition into an area of the spilled oil.

3. The method of claim 1 wherein said one or more lecithins are of plant origin.

4. The method of claim 3 wherein said one or more lecithins is soy lecithin.

5. The method of claim 1 wherein the solid hydrophobic substrate comprises a surface of a living creature.

6. The method of claim 5 wherein the surface comprises feathers.

7. The method of claim 5 wherein the surface comprises hair.

8. The method of claim 5 wherein the surface comprises plants.

9. A method of mitigating spreading of spilled oil from seawater to a solid hydrophobic substrate without wetting the solid hydrophobic substrate comprising applying to the spilled oil a composition comprising a phospholipid selected from the group consisting of a lecithin and a lecithin derivative and combinations thereof, and at least one cellulose ether selected from the group consisting of hydroxypropylcellulose, hydroxypropylmethylcellulose, and combinations thereof.

10. The method of claim 9 wherein said phospholipid is a lecithin.

11. The method of claim 10 wherein said lecithin is of plant origin.

12. The method of claim 11 wherein said lecithin is soy lecithin.

13. The method of claim 9 wherein said applying to the spilled oil is performed by an application selected from the group consisting of spraying, spreading, and pumping said composition into an area of the spilled oil.

14. The method of claim 9 wherein the solid hydrophobic substrate comprises a surface of a living creature.

15. The method of claim 14 wherein the surface comprises feathers.

16. The method of claim 14 wherein the surface comprises hair.

17. The method of claim 14 wherein the surface comprises plants.

* * * * *